June 7, 1932.                C. P. SCHILPP                1,862,036
                            ARTIFICIAL BAIT
                         Filed Aug. 20, 1929

Inventor
Charles P. Schilpp
By Slough and Canfield
Attorney

Patented June 7, 1932

1,862,036

UNITED STATES PATENT OFFICE

CHARLES P. SCHILPP, OF CLEVELAND HEIGHTS, OHIO, ASSIGNOR TO THE AMERICAN FORK & HOE COMPANY, OF CLEVELAND, OHIO, A CORPORATION OF OHIO

ARTIFICIAL BAIT

Application filed August 20, 1929. Serial No. 387,205.

My invention relates to artificial bait and relates particularly to artificial bait of that type which is so formed that when drawn through the water at the end of a fish line its movements will simulate the movements of a live minnow, for the purpose of attracting game fish.

My invention particularly relates to the provision of an artificial bait which when drawn through the water will move in simulation of the movements of a crippled minnow, which, as is well known, swims largely on its side with a wiggling movement.

One of the objects of my invention is to provide such a bait which will effect the desired movement when drawn through the water at widely varying rates of speed.

Another object of my invention is to provide a bait of the above type which will be so formed that it will travel through the water at the proper level depending upon its rate of travel and which will not readily rotate to an undesired inverted position.

Another object is to provide a bait of the above general character which will not become enmeshed in weeds and grasses through which the bait is drawn.

Other objects of my invention and the invention itself will be more readily understood by reference to the following description of an embodiment of my invention and from the drawing referred to therein and illustrating the said embodiment.

Referring to the drawing:—

Referring now to the different figures of drawing in all of which like parts have been designated by like reference characters:—

Figure 3:
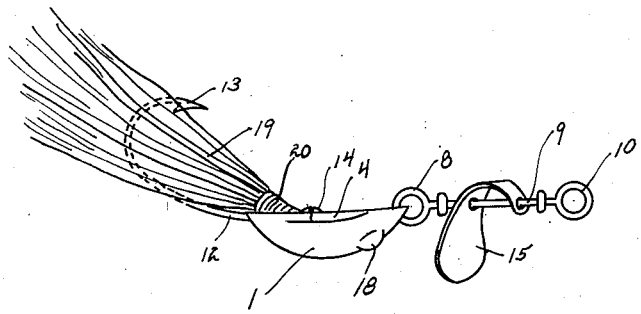
Fig. 3 is a side elevational view of the bait of Fig. 1 together with other of the appurtenances in association with which my improved bait is adapted to be used.

The bait of my invention comprises a concavo-convex body, shown generally at 1, of elongated form and of substantial thickness particularly in its longitudinal medial portion, the body being preferably bowed in a longitudinal direction.

The upper surface of the body is hollowed at 2, preferably throughout its length. A pair of oppositely extending fins or vanes 3 and 4 project laterally from the upper side edges of the body proper and are of preferably stream line, triangular in outline with the leading edge portion 5 merging curvilinearly with the leading edge portion 6 of the body proper.

The forward or leading end of the body is provided with a perforation 7 adapted to receive a tractive element of a fish line such as the eye 8 of the spinner rod 9, which at its other end is preferably provided with an eye 10 to which the line itself may be affixed.

A spinner element 15 is preferably journalled on an intermediate portion of the rod 9, although for some purposes may be omitted. This and the rod itself may be omitted, the line in such case being secured directly to the bait, being passed through the aperture 7 thereof.

The rear or trailing upper edge portion of the body is notched at 11 to receive the shank 12 of a fish hook 13, which is secured to the upper recessed surface 2 of the body by a machine screw 14 projected through the eye 22 of the hook shank and screw threaded into the body 1, as shown at 16.

The head of the screw 14 presses the shank 12 of the hook tightly between the walls of the notch 11, said walls engaging the shank of the hook to hold the hook against lateral displacement relative to the trailing end of the bait.

The bait is suitably colored in such a manner as to optically intrigue the fish, such as for instance by giving the body portion proper a bright metallic luster, by polishing the metal forming the body or by metallic painting or otherwise and the fins or vanes may be painted red or otherwise to contrast with the metallic color of the body.

The body may preferably also be provided near its forward convex underside with a protuberance 18 which may be painted red or otherwise to contrast with the body giving the general appearance of an eye for the minnow whose form is generally simulated by the moving bait.

Figure 1:
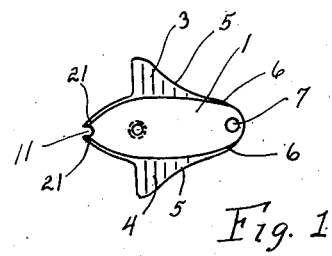
Fig. 1 is a plan view of a preferably metallic artificial bait embodying the principles of my invention.
Figure 2:
Fig. 2 is an end elevational view of the bait of Fig. 1.
Figure 4:
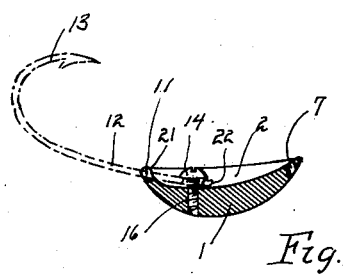
Fig. 4 is a longitudinal medial sectional view of the bait of the foregoing figures together with a hook element of the above said appurtenances, only, being shown attached thereto, the other appurtenances being omitted in this view for the purpose of effecting a better understanding of the method of connecting the hook to the bait.

The vanes are progressively thickened from their edges toward their portions merging with the body proper and are preferably provided on their upper and lower surfaces with parallel laterally extending grooves giving the vanes a ribbed appearance, as illustrated in Fig. 1.

The hook may be concealed as illustrated in Fig. 3 at 19 by a brush of bucktail or feathers secured to the hook, and where this is done, the bunched ends of the fibres or feathers will preferably be bound as at 20 to the shank of the hook preferably intermediate the horns 21 of the rear end of the body formed by the provision of the notch 11 thereat.

This arrangement insures retension of the brush on the shank and prevents sliding longitudinally thereon.

The hook with the brush, where a brush is provided, may be readily removed for inspection, replacement or repair by merely withdrawing the screw 14 from the threaded opening of the body and without the necessity of deforming any part of the hook or its shank in order to position or remove it from the body.

Having described a particular embodiment of my invention, I am aware that numerous and extensive modifications and departures may be made from the embodiment of my invention herein illustrated and described, but without departing from the spirit thereof.

I claim:

1. In an artificial bait for fish lines, a metallic body of substantially concavo-convex form thickened in all directions toward its medial longitudinal portion and convexly rounded on its outer surface, means whereby a line may be attached to the body to draw it through the water with the convex surface downward, and vanes integrally formed with the body extending laterally from the upper side edge portions, said vanes being of substantial area and having upwardly forwardly sloping under surfaces to effect a substantial buoying effort on the body when the body is drawn through the water during the retrieving portion of a casting operation.

2. In an artificial bait for fish lines, a metallic body of substantially concavo-convex form thickened in all directions toward its medial longitudinal portion and convexly rounded on its outer surface, vanes integrally formed therewith extending laterally from the upper side edge portions of the body, said body being provided with a longitudinally extending concavity in its upper surface intermediate the vanes, said concave upper surface having means to receive the eye of a hook, and screw means to secure the hook by its eye to an intermediate portion of said concave surface, the rear upper edge of said body being notched to receive the shank of the hook positioned therein solely by said screw, said hook being removable upwardly from the body when said screw is removed.

3. In an artificial bait for fish lines, a metallic body of substantially concavo-convex form thickened in all directions toward its medial longitudinal portion and convexly rounded on its outer surface, means whereby a line may be attached to the body to draw it through the water with the convex surface downward, and vanes integrally formed with the body extending laterally from the upper side edge portions thereof, said vanes being of substantial area having upwardly forwardly sloping under surfaces which effect a substantial buoying effort on the body when the body is drawn through the water during the retrieving portion of a casting operation, said vanes being of generally triangular form and disposed in generally horizontal planes and having outwardly rearwardly diverging lateral edges merging curvilinearly with the more forwardly disposed portions of the body proper.

4. In an artificial bait for fish lines, a metallic body of substantially concavo-convex form thickened in all directions toward its medial longitudinal portion and convexly rounded on its outer surface and vanes integrally formed therewith extending laterally from the upper side edge portions thereof, said vanes being of substantial area having upwardly forwardly sloping under surfaces, which effect the substantial buoying effort on the body when the body is drawn through the water during the retrieving portion of a casting operation, said line attaching means comprising a perforation in the body at its forward end to receive an element of a fish line and the body being recessed throughout the entire extent of its upper surface, exclusive of said vanes, said vanes extending from the nose of the body to rearwardly of its middle, being widest at their rear portions.

In testimony whereof I hereunto affix my signature this 12th day of August, 1929.

CHARLES P. SCHILPP.